United States Patent [19]
Licata

[11] Patent Number: 6,113,482
[45] Date of Patent: Sep. 5, 2000

[54] METAL-DETECTABLE ELASTOMERIC MATERIAL FOR PISTON SEALS AND THE LIKE

[75] Inventor: Michael P. Licata, Lee's Summit, Mo.

[73] Assignee: Marlen Research Corporation, Overland Park, Kans.

[21] Appl. No.: 09/329,480

[22] Filed: Jun. 10, 1999

[51] Int. Cl.[7] .................................................. A22C 11/04
[52] U.S. Cl. ........................... 452/40; 452/42; 277/235 R
[58] Field of Search .................................. 452/42, 43, 40; 277/2, 80, 235 R, 236

[56] References Cited

U.S. PATENT DOCUMENTS

| | | |
|---|---|---|
| 3,456,285 | 7/1969 | Miller et al. . |
| 4,097,962 | 7/1978 | Alley et al. . |
| 4,205,904 | 6/1980 | Skubich et al. . |
| 4,763,792 | 8/1988 | Kind . |
| 4,922,746 | 5/1990 | Hulsman et al. ........................ 73/49.3 |

*Primary Examiner*—Willis Little
*Attorney, Agent, or Firm*—Hovey, Williams, Timmons & Collins

[57] ABSTRACT

An elastomeric material for articles such as dynamic seals and the like is rendered detectable by conventional metal detectors through the incorporation of particles of a metallic alloy. Preferably, the resulting impregnated material contains at least 0.25% and no more than about 50% by volume of the alloy, with 2% by volume being the most favored. In one embodiment, the alloy contains 11.0% to 22.0 % by weight of Iron, 70.0% to 90.0% by weight of Nickel, and 0.0% to 7.0% by weight of Molybdenum. In another embodiment, the alloy contains 14.0% to 19.0% by weight of Iron, 80.0% to 83.0% by weight of Nickel, and 1.0% to 3.0% by weight of Molybdenum, and in the most preferred embodiment, the alloy contains about 15.43% by weight of Iron, about 82.39% by weight of Nickel, and about 2.17% by weight of Molybdenum.

37 Claims, 1 Drawing Sheet

METAL-DETECTABLE ELASTOMERIC MATERIAL FOR PISTON SEALS AND THE LIKE

TECHNICAL FIELD

The present invention relates in its broadest aspects to a material having particular, but not exclusive, utility as the composition from which elastomeric articles such as seals, diaphragms, and the like may be constructed such that fragments of the article, if it becomes damaged, can be detected by a metal detector. In its more specific respects, the present invention relates to the food processing industry and to a way of detecting fragments of a damaged elastomeric article such as a seal that may have been released into the food product as it passes through a processing system.

BACKGROUND

Food processing systems typically utilize pumps of various constructions to move the product through the system. One type of continuous pump using alternating pistons is disclosed in U.S. Pat. No. 3,456,285 issued Jul. 22, 1969, and U.S. Pat. No. 4,097,962 issued Jul. 4, 1978, both of which are owned by the Assignee of the present invention. The '285 patent and the '962 patent are hereby incorporated by reference into this specification to the extent necessary for an enabling disclosure and complete description of the present invention.

Reciprocating piston pumps of this type utilize elastomeric seals at various locations. The '285 patent, for example, discloses the use of a sliding seal 33. In certain situations, such seals may become broken or damaged, allowing fragments thereof to enter the stream of food product moving through the system. Until the present invention, no satisfactory way of achieving an early detection of such elastomeric seal fragments in the product has been available. Consequently, if it is discovered during clean-up operations at the end of the day that one of the seals has been damaged, the entire day's production of food product has to be scrapped. This can be an enormous amount of material, considering that modern food pumps are capable of a throughput on the order of 30,000 pounds of product per hour.

Accordingly, it would be desirable to have an early detection means as part of the processing system itself which could detect fragments of the elastomeric seal almost immediately after they are released into the product such that the system could be quickly shut down and the problem attended to before inordinate amounts of the fragment-containing product are produced. However, elastomeric particles or fragments are extremely difficult to detect in a manner that is economically practical. While detection devices utilizing X-rays are commercially available to serve this purpose, they are extremely expensive to the extent that their use has thus far been largely cost-prohibitive.

Various types of metal detectors are currently commercially available for use with food processing systems. Such detectors are used to discover fragments or chunks of metal in the product flow and, in many cases, to cause the offending product to be diverted from the main product stream until the problem is cleared up.

However, metal detectors detect metal, not elastomeric materials. Therefore, to date they have not been used to solve the problem of early detection of fragmenting elastomeric seals.

SUMMARY OF THE INVENTION

Accordingly, an important object of the present invention is to provide an elastomeric material that can be detected even in fragment form by a metal detector. Such material may be utilized, for example in seals of various shapes and sizes, in diaphragms such as those used for sensing and pumping, and in a variety of technologies such as food processing, the pulp and paper industry, hydraulics, and textiles.

A specific important object is to provide for early detection of elastomeric seal fragments in the food processing industry. It is also an important object to provide such a material that is non-toxic, low-cost, has low abrasivity, and easy manufacturability.

In carrying out the above and other objects, the present invention contemplates an elastomeric material containing particles of a metallic substance. Desirably, the metallic substance has a high permeability and is available in powder form to facilitate manufacture. The particles are mixed with the elastomer prior to molding the finished seal so that they are contained within the elastomer at the time the seal is being molded.

In one embodiment of the invention, the metallic substance comprises a metal alloy containing 11.0% to 22.0% by weight of Iron, 70.0% to 90.0% by weight of Nickel, and 0.0% to 7.0% by weight of Molybdenum. A more preferred embodiment contains a metal alloy having 14.0% to 19.0% by weight of Iron, 80.0% to 83.0% by weight of Nickel, and 1.0% to 3.0% by weight of Molybdenum. In its most preferred form, the invention comprises an elastomeric material containing particles of a metal alloy having about 15.43% by weight of Iron, about 82.39% by weight of Nickel, and about 2.17% by weight of Molybdenum.

Preferably, seals made from the metal particle impregnated elastomer contain at least about 0.25% by volume of the metallic substance, but no more than about 50% by volume of the metallic substance. In the most preferred form of the invention, the seal body contains about 2% by volume of the metallic substance.

DETAILED DESCRIPTION

Figure 1:
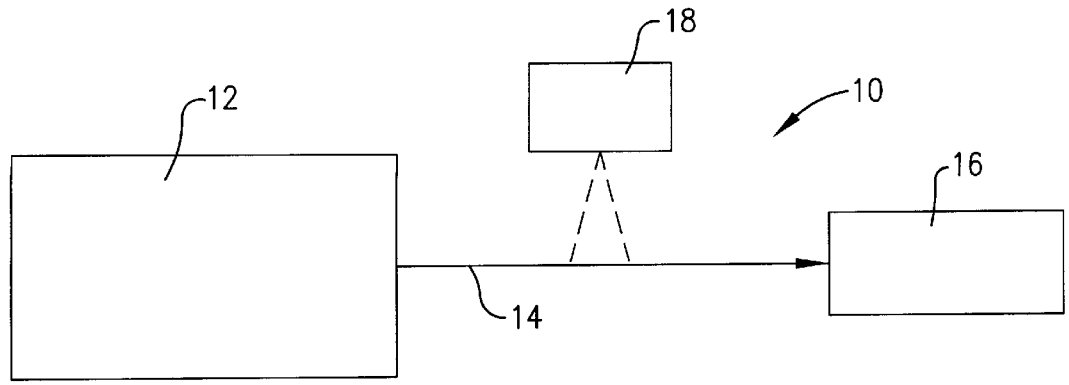
FIG. 1 is a schematic diagram of a system such as a food processing system with which the principles of the present invention may be utilized.

The schematic illustration in FIG. 1 discloses a food processing system 10 that includes a pump 12, structure 14 coupled with the pump 12 for moving product from the pump toward an ultimate place of delivery 16, and a metal detector 18. The structure 14 may comprise, for example, a conduit that is completely enclosed, a flume, a ramp, or an open, mechanical conveyor. In either event, the structure serves to define a path of travel of product in the processing system 10.

The food processing system 10 is but one example of an environment in which the principles of the present invention may be utilized. Although the remainder of the disclosure which follows will be presented using a food processing system as one preferred mode of the invention, it is to be understood that such reference to a food processing system is by way of example only and that the principles of the present invention are not limited to that particular environment of use.

The pump 12 may take several different forms, including that illustrated in the patents incorporated by reference above, i.e., U.S. Pat. No. 3,456,285 and U.S. Pat. No. 4,097,962. Such pump utilizes reciprocating pistons that, through alternating actuations, cause a continuous flow of product through the transfer line 14 toward the ultimate place of delivery 16.

Figure 2:
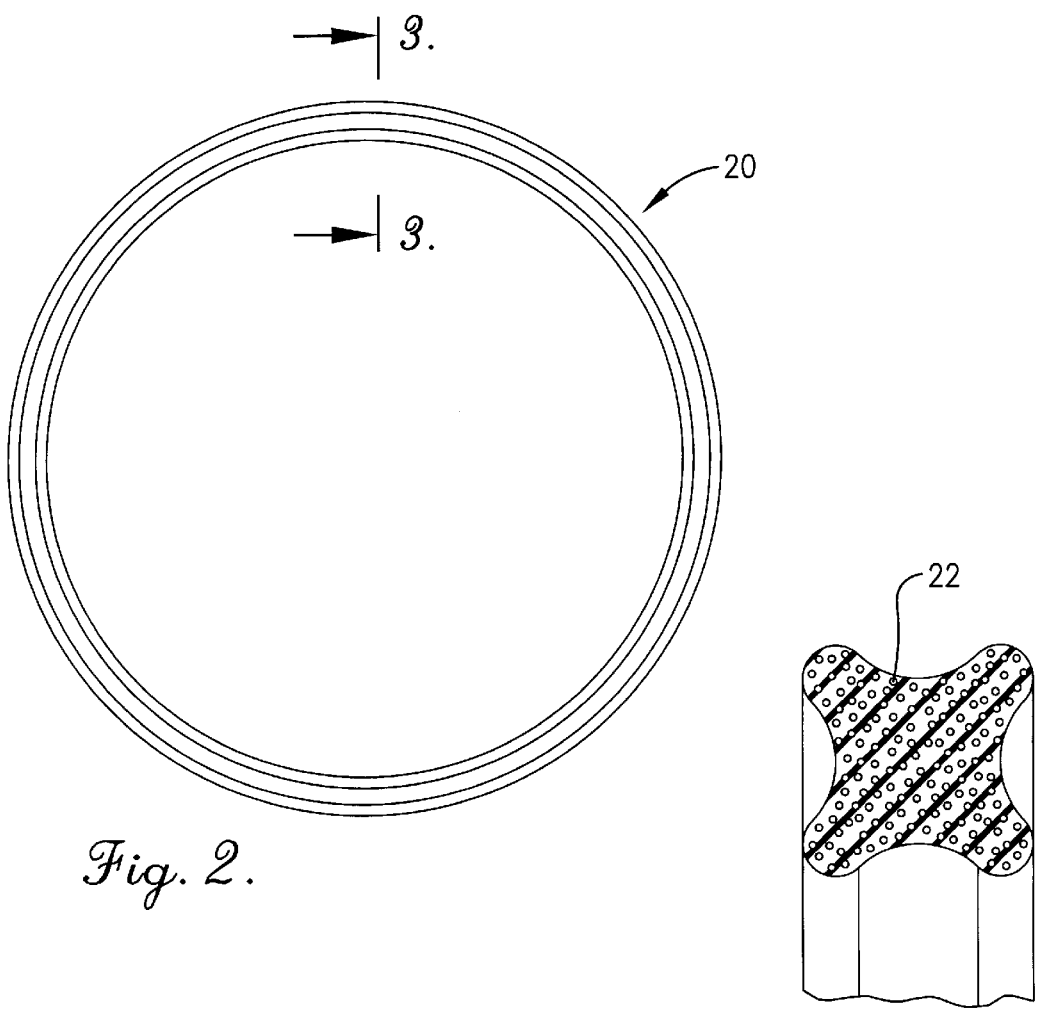
FIG. 2 is a plan view of an annular, elastomeric seal incorporating the principles of the present invention.
Figure 3:
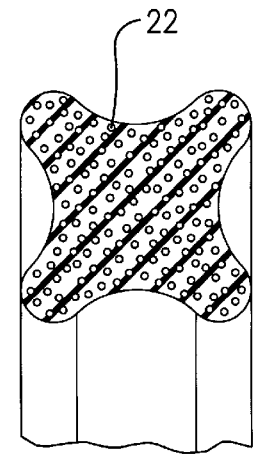
FIG. 3 is an enlarged transverse cross sectional view of the seal taken substantially along line 3—3 of FIG. 2 illustrating particles of a metallic alloy dispersed throughout the body of the seal.

Within such pump 12 are disposed one or more annular seals such as, for example, the seal 20 illustrated in FIGS. 2 and 3. In accordance with the present invention, the seal 20 comprises an annular body of elastomeric material impregnated with particles 22 (FIG. 3) of a metallic substance. The elastomeric material from which the seal is constructed may be natural rubber or various polymers such as a synthetic rubber, acrylonitrile butadiene being the elastomer of choice.

The metallic substance contained within the body of the seal 20 comprises an alloy of Iron, Nickel and Molybdenum. In one embodiment, the alloy contains 11.0% to 22.0% by weight of Iron, 70.0% to 90.0% by weight of Nickel, and 0.0% to 7.0% by weight of Molybdenum. In another embodiment, the alloy contains 14.0% to 19.0% by weight of Iron, 80.0% to 83.0% by weight of Nickel, and 1.0% to 3.0% by weight of Molybdenum. In its most preferred form, the alloy contains about 15.43% by weight of Iron, about 83.29% by weight of Nickel, and about 2.17% by weight of Molybdenum. The alloy is commercially available in powdered form from a number of sources well known to those skilled in the art and identified by the trade designation "Permalloy 2 - 81." Permalloy 2 - 81 is preferred in part because of its high magnetic permeability and acceptable conductivity.

One embodiment of the invention has the elastomer combined with the alloy in such proportions that the alloy comprises at least 0.25% by volume of the composition and no greater than about 50% by volume. In its preferred form, the composition contains about 2% by volume of the alloy.

The metal detector 18 may take the form of a number of different commercially available units as well understood by those skilled in the art. Such units are available, for example, from Fortress Technology, Inc. of Scarborough, Ontario, Canada, and are available in "pipeline" models in the event the transfer line 14 comprises a conduit, as well as conveyor models in the event that the transfer line 14 comprises a mechanical conveyor belt assembly. The Fortress units, as well as other metal detectors, function by emitting a high frequency radio signal that establishes an electromagnetic field intersecting and disposed about the path of travel of the product through the conduit or along the conveyor. Normally, a steady, stable condition exists between the energy emitted and received by the detector, but when a metal article passes through the field, the stable condition is destabilized and a signal is generated by the detector. That signal can be utilized in a number of ways such as, for example, actuating an alarm and/or actuating a diverter to temporarily divert product from the main product flow into a secondary region.

When one or more fragments of the elastomeric seal 20 is released into the product flow due to damage or wear of the seal, such fragments are immediately detected by the detector 18. At that point, operation of the system can be halted and the components thereof inspected to determine the source of the problem. Thus, instead of being unaware of the problem until cleanup operations at the end of the day, the food processor can be immediately alerted to the problem so as to permit timely and effective resolution thereof. In effect, whereas in the past elastomeric seals have not been readily detectable by conventional metal detectors, elastomeric seals incorporating metallic alloy in keeping with the present invention, as well as fragments of such seals, are now readily detectable. Such early detection can result in enormous cost savings.

What is claimed is:

1. An elastomeric article comprising:

a body of predetermined shape constructed from elastomeric material; and particles of a metallic substance impregnated within the body, said substance comprising a metal alloy containing 11.0% to 22.0% by weight of Iron, 70.0% to 90.0% by weight of Nickel, and 0.0% to 7.0% by weight of Molybdenum.

2. An article as claimed in claim 1, said alloy containing 14.0% to 19.0% by weight of Iron, 80.0% to 83.0% by weight of Nickel, and 1.0% to 3.0% by weight of Molybdenum.

3. An article as claimed in claim 2, said alloy containing about 15.43% by weight of Iron, about 82.39% by weight of Nickel, and about 2.17% by weight of Molybdenum.

4. An article as claimed in claim 1, said body comprising an annular seal.

5. An article as claimed in claim 1, said elastomeric material comprising a polymer.

6. An article as claimed in claim 5, said polymer comprising acrylonitrile butadiene.

7. An article as claimed in claim 1, said body containing at least 0.25% by volume of the metallic substance.

8. An article as claimed in claim 7, said body containing no more than about 50% by volume of the metallic substance.

9. An article as claimed in claim 8, said body containing about 2% by volume of the metallic substance.

10. An article as claimed in claim 7, said alloy containing 14.0% to 19.0% by weight of Iron, 80.0% to 83.0% by weight of Nickel, and 1.0% to 3.0% by weight of Molybdenum.

11. An article as claimed in claim 10, said alloy containing about 15.43% by weight of Iron, about 82.39% by weight of Nickel, and about 2.17% by weight of Molybdenum.

12. An article as claimed in claim 11, said body containing no more than about 50% by volume of the metallic substance.

13. An article as claimed in claim 12, said body containing about 2% by volume of the metallic substance.

14. In a food processing system having a path of travel for a food product as it moves through the system and an elastomeric article within the system having access to the food product, the improvement comprising:

particles of a metallic substance impregnated within the body, said substance comprising a metal alloy containing 11.0% to 22.0% by weight of Iron, 70.0% to 90.0% by weight of Nickel, and 0.0% to 7.0% by weight of Molybdenum; and a metal detector positioned downstream from the article adjacent the path of travel of the product operable to detect and generate a signal in the event that a fragment of the seal enters the product.

15. In a food processing system as claimed in claim 14, said system including a pump, said article comprising an annular seal associated with said pump.

16. In a food processing system as claimed in claim 15, said system further including a conduit coupled with the pump for receiving product therefrom and defining a portion of said path of travel of the product, said metal detector being operably associated with said conduit.

17. In a food processing system as claimed in claim 15, said system further including a mechanical conveyor disposed for receiving product from the pump and defining a portion of said path of travel of the product, said metal detector being operably associated with said conveyor.

18. In a food processing system as claimed in claim 16, said alloy containing 14.0% to 19.0% by weight of Iron, 80.0% to 83.0% by weight of Nickel, and 1.0% to 3.0% by weight of Molybdenum.

19. In a food processing system as claimed in claim 18, said alloy containing about 15.43% by weight of Iron, about 82.39% by weight of Nickel, and about 2.17% by weight of Molybdenum.

20. In a food processing system as claimed in claim 16, said body containing at least 0.25% by volume of the metallic substance.

21. In a food processing system as claimed in claim 20, said body containing no more than about 50% by volume of the metallic substance.

22. In a food processing system as claimed in claim 21, said body containing about 2% by volume of the metallic substance.

23. In a food processing system as claimed in claim 20, said alloy containing 14.0% to 19.0% by weight of Iron, 80.0% to 83.0% by weight of Nickel, and 1.0% to 3.0% by weight of Molybdenum.

24. In a food processing system as claimed in claim 23, said alloy containing about 15.43% by weight of Iron, about 82.39% by weight of Nickel, and about 2.17% by weight of Molybdenum.

25. In a food processing system as claimed in claim 24, said body containing no more than about 50% by volume of the metallic substance.

26. In a food processing system as claimed in claim 25, said body containing about 2% by volume of the metallic substance.

27. A method of detecting fragments of an elastomeric article within product being processed by a food product processing system comprising the steps of:

impregnating particles of a metallic substance within the body of the article before the article is installed in the system, said substance comprising a metal alloy containing 11.0% to 22.0% by weight of Iron, 70.0% to 90.0% by weight of Nickel, and 0.0% to 7.0% by weight of Molybdenum;

installing the article in the system;

processing food product in the system to move product along a path of travel downstream from the seal; and while food product is being processed, monitoring the product with a metal detector at a location adjacent said path of travel to detect and generate a signal in the event that a fragment of the article enters the product.

28. A method as claimed in claim 27, said alloy containing 14.0% to 19.0% by weight of Iron, 80.0% to 83.0% by weight of Nickel, and 1.0% to 3.0% by weight of Molybdenum.

29. A method as claimed in claim 28, said alloy containing about 15.43% by weight of Iron, about 82.39% by weight of Nickel, and about 2.17% by weight of Molybdenum.

30. A method as claimed in claim 27, said body containing at least 0.25% by volume of the metallic substance.

31. A method as claimed in claim 30, said body containing no more than about 50% by volume of the metallic substance.

32. A method as claimed in claim 31, said body containing about 2% by volume of the metallic substance.

33. A method as claimed in claim 30, said alloy containing 14.0% to 19.0% by weight of Iron, 80.0% to 83.0% by weight of Nickel, and 1.0% to 3.0% by weight of Molybdenum.

34. A method as claimed in claim 33, said alloy containing about 15.43% by weight of Iron, about 82.39% by weight of Nickel, and about 2.17% by weight of Molybdenum.

35. A method as claimed in claim 34, said body containing no more than about 50% by volume of the metallic substance.

36. A method as claimed in claim 35, said body containing about 2% by volume of the metallic substance.

37. A method as claimed in claim 27, said article comprising a seal.

\* \* \* \* \*